United States Patent [19]
Baird

[11] 3,824,593
[45] July 16, 1974

[54] MILLIMETER WAVE IMAGING SYSTEM USING DIRECT CARRIER INJECTION

[75] Inventor: Joseph M. Baird, Newberry Park, Calif.

[73] Assignee: Hughes Aircraft Company, Culver City, Calif.

[22] Filed: Dec. 4, 1972

[21] Appl. No.: 312,005

[52] U.S. Cl. ............................ 343/17, 340/173 SP
[51] Int. Cl. ............................................. G01s 7/04
[58] Field of Search ................ 343/17, 7.9, 18 B; 340/173 SP

[56] References Cited
UNITED STATES PATENTS
| | | | |
|---|---|---|---|
| 3,122,742 | 2/1964 | Hovannesian et al. | 343/17 |
| 3,403,399 | 9/1968 | Jacobs et al. | 343/17 |
| 3,717,843 | 2/1973 | Farrah et al. | 343/17 |

Primary Examiner—Maynard R. Wilbur
Assistant Examiner—G. E. Montone
Attorney, Agent, or Firm—William J. Bethurum; W. H. MacAllister

[57] ABSTRACT

Disclosed is a millimeter wave imaging system which includes means for illuminating a remote target with RF energy and means for receiving and processing the RF energy which is reflected from the target. The processing means includes a diode array upon which the received energy is focussed and which is directly driven by an X-Y addressing system. The diodes in the array are digitally scanned directly to thereby directly inject carriers sequentially into the diodes in the panel. These diodes alternately pass and absorb the incoming RF energy at high image conversion rates, thereby imparting maximum resolution to the imaging system and enabling real time operation. Simultaneously, heat and power dissipation is minimized.

18 Claims, 7 Drawing Figures to Fig. 5b.

MILLIMETER WAVE IMAGING SYSTEM USING DIRECT CARRIER INJECTION

The invention herein described was made in the course of or under a contract or subcontract thereunder with the Army.

FIELD OF THE INVENTION

This invention relates generally to millimeter wave imaging systems and more particularly to such a system for visually displaying the image of remote targets utilizing direct carrier injection techniques.

BACKGROUND

Various millimeter wave imaging systems have been employed in the past to provide a visual display of remote targets and the like. Millimeter wave RF energy of particular wavelengths has been found to best penetrate through fog, heavy rain, snow and the like with less attenuation than RF energies of shorter wavelengths, and thus there has been a great effort in recent years to optimize a variety of different types of millimeter wave radar systems. Generally speaking, these systems include a means for illuminating a remote target with millimeter wave energy and means for receiving and processing the energy reflected from the target using various scanning techniques in order to reconstruct the target on some suitable visual display means. These systems include radiating antennae which illuminate or "flood" the complete target, as well as those antennae which scan the target on a point-by-point basis.

PRIOR ART

One type of prior art millimeter wave imaging system radiates the entire target with millimeter wave energy, directs the target reflected millimeter wave energy onto a semiconductor panel, and then optically scanes the semiconductor panel to modulate the conductivity thereof. The RF energy projected onto the smeiconductor panel is thus optically scanned at predetermined rates and further processed as raster information using conventional video techniques to drive a visual display. An example of this prior art millimeter wave imaging system may be found in Jacobs et al. U.S. Pat. No. 3,403,399.

The optical modulation of the semiconductor panel in this prior art system is produced by the photon excitation of carriers from point to point in the bulk semiconductive material. The scanning and thus image conversion speeds which may be attained using this optical scanning method are limited by the carrier lifetimes in the bulk semiconductor, and these lifetimes are sufficiently long so that the frequency response of the panel does not permit real time millimeter wave image conversion. The latter is true for both the transmission mode sampling which uses a flying dark spot to scan the semiconductor panel or the reflection mode sampling which utilizes a flying light spot to scan the semiconductor panel. Furthermore, the scanning speeds which may be attained using these optical scanning techniques are further limited by the mechanical movements of the system optics.

In order to overcome the above problems associated with prior art millimeter wave imaging systems, it has been recently proposed to utilize direct carrier injection to modulate the semiconductor panel of the above system and thus provide a replacement for the above optical scanning techniques. Such a proposal is found in a document entitled "Technical Guidelines for Image Conversion Panel Techniques Using Direct Carrier Injection" published by the Solid State & Frequency Control Division — Electronic Components Laboratory of the U.S. Army Electronics Command, Fort Monmouth, New Jersey, Aug. 18, 1970. This proposed technique would apparently involve directly driving a semiconductor panel to inject carriers therein in order to achieve higher scanning speeds than those attained by the above prior art optically scanned imaging systems. Thus, conceptually at least, the state of the art as known to me prior to this invention was potentially capable of increasing the scanning speeds of these prior art millimeter wave imaging systems which, in the past, have been inherently limited in frequency response. However, as far as known to me, imaging systems utilizing direct carrier injection techniques for achieving these increased and improved scanning speeds did not exist.

THE INVENTION

The general purpose of the present invention is to provide a novel alternative approach to the above prior art optically scanned imaging systems and to provide a commercially practical millimeter wave imaging system which utilizes direct carrier injection to achieve real time operation. The invention thus overcomes the above-described response time disadvantages associated with the optically scanned prior art millimeter wave imaging systems. To attain this purpose, I have constructed a novel millimeter wave imaging system, and this system includes a novel RF energy-collecting semiconductor diode panel and a novel means for electrically addressing same. The semiconductor diode panel includes an array of discrete X-Y addressable semiconductor diodes, and these diodes receive the target reflected RF energy via novel associated RF collecting means in such a manner as to achieve high carrier modulation and RF gating in each diode. At the same time, however, the physical size of each diode is maintained within prescribed limits, so that the power and heat dissipated in each diode is minimized. The means for addressing the semiconductor diode panel includes novel X-Y digital drive and scanning circuitry which is particularly suited for driving a diode panel with series connected diode elements.

Accordingly, an object of the present invention is to provide a new and improved high speed and high resolution millimeter wave imaging system.

Another object is to provide an imaging system of the type described which utilizes direct carrier injection in semiconductors to achieve scanning speeds that enable real time image conversion.

Another object of the invention is to provide a novel semiconductor diode image conversion panel which is especially adapted for use in the above imaging system and which is operative to provide high resolution image conversion with a minimum of power and heat dissipation.

A further object of this invention is to provide novel X-Y digital drive circuitry which is particularly adapted for operation with the present imaging system and with the diode panel thereof which includes columns of series connected diodes. This circuitry is relatively simple

DRAWINGS

DETAILED DESCRIPTION

Figure 1:
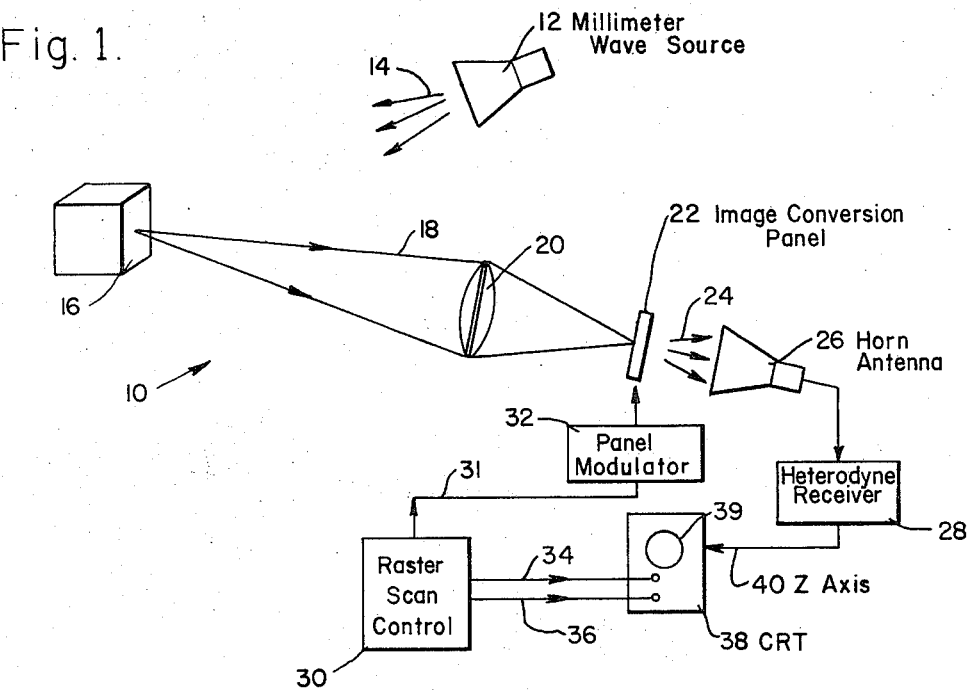
FIG. 1 is a block diagram representation of the transmission mode millimeter wave imaging system according to the present invention.

Referring now to FIG. 1, there is shown a source 12 of millimeter wave energy, and this source may typically include a reflex klystron, a magnetron or other high frequency oscillator for generating millimeter waves at relatively high power levels. Energy from the source 12 is propagated towards a remote target 16 from which it is reflected. In the embodiment of the invention to be described, the object or target 16 is flooded by continuous wave (CW) RF energy 14; but the present invention is not limited to this mode of wave transmission and may also be used in systems where the target 16 is scanned on a point by point basis. The reflected RF energy 18 is focused by a suitable lens 20 onto a semiconductor image dissecting panel 22, the specific structure of which will be further decribed. This focusing is carried out using conventional optical techniques which will not be described herein in detail. The RF energy impinging on the image conversion panel 22 is gated therethrough in raster fashion and collected by a suitable horn antenna collector 26 whose output is connected as shown to the input of a heterodyne receiver 28.

A raster scan control unit 30 includes a clock which drives a plurality of X-Y shift registers (not shown), and the unit 30 is of conventional construction and is therefore not described herein in further detail. The unit 30 has an output terminal 31 connected as shown to drive a panel modulator 32. The modulator 32 directly scans the panel 22 at predetermined scan rates. The scan control unit 30 also generates X and Y vertical and horizontal output control signals, respectively, which are synchronized with the panel modulator drive signals on line 31, and these X and Y signals are connected via lines 34 and 36 to the vertical and horizontal deflection electrodes (not shown) of a cathode ray tube (CRT) 38. The CRT 38 provides the visual display of the target 16 and may be of conventional state-of-the-art CRT design.

The target amplitude information at the output of the heterodyne receiver 28 is connected via conductor 40 to the CRT 38 and provides the Z axis amplitude information for the CRT 38. This latter Z axis amplitude information is, of course, synchronized with the X and Y deflection signals on lines 34 and 36. Therefore, the RF energy which is gated through the image conversion panel 22 provides the Z axis amplitude information for the CRT 38, the later being controlled in a conventional manner by the horizontal and vertical deflection signals in the CRT 38 so as to reconstruct the target on the CRT display screen 39.

Figure 5B:
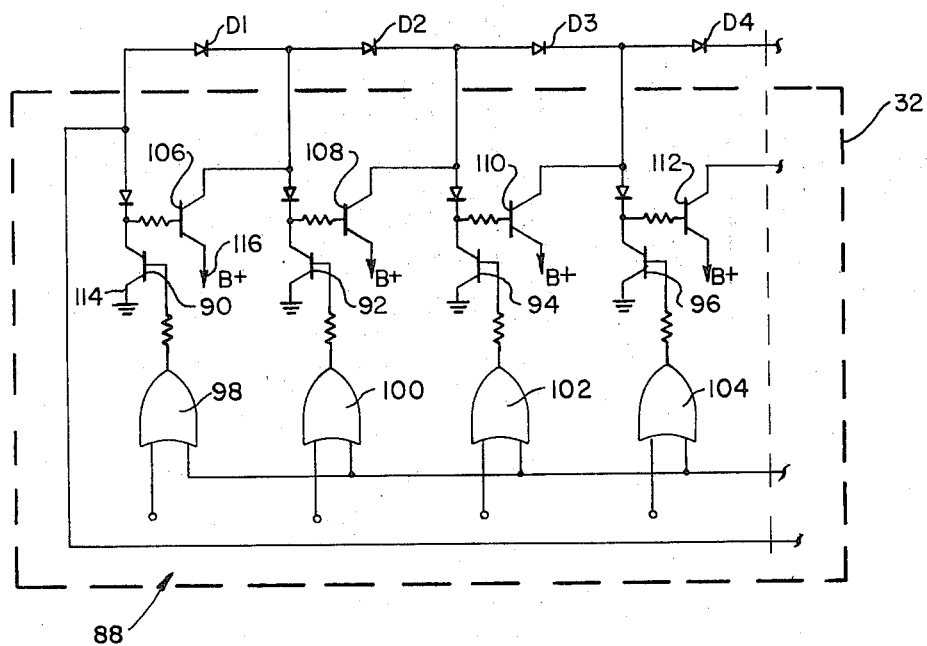
FIG. 5b is a schematic diagram of useful driver logic circuitry for direct connection to the X-Y address scheme in FIG. 5a and for rapidly and sequentially scanning the diodes in each column of the image conversion panel.
Figure 5A:
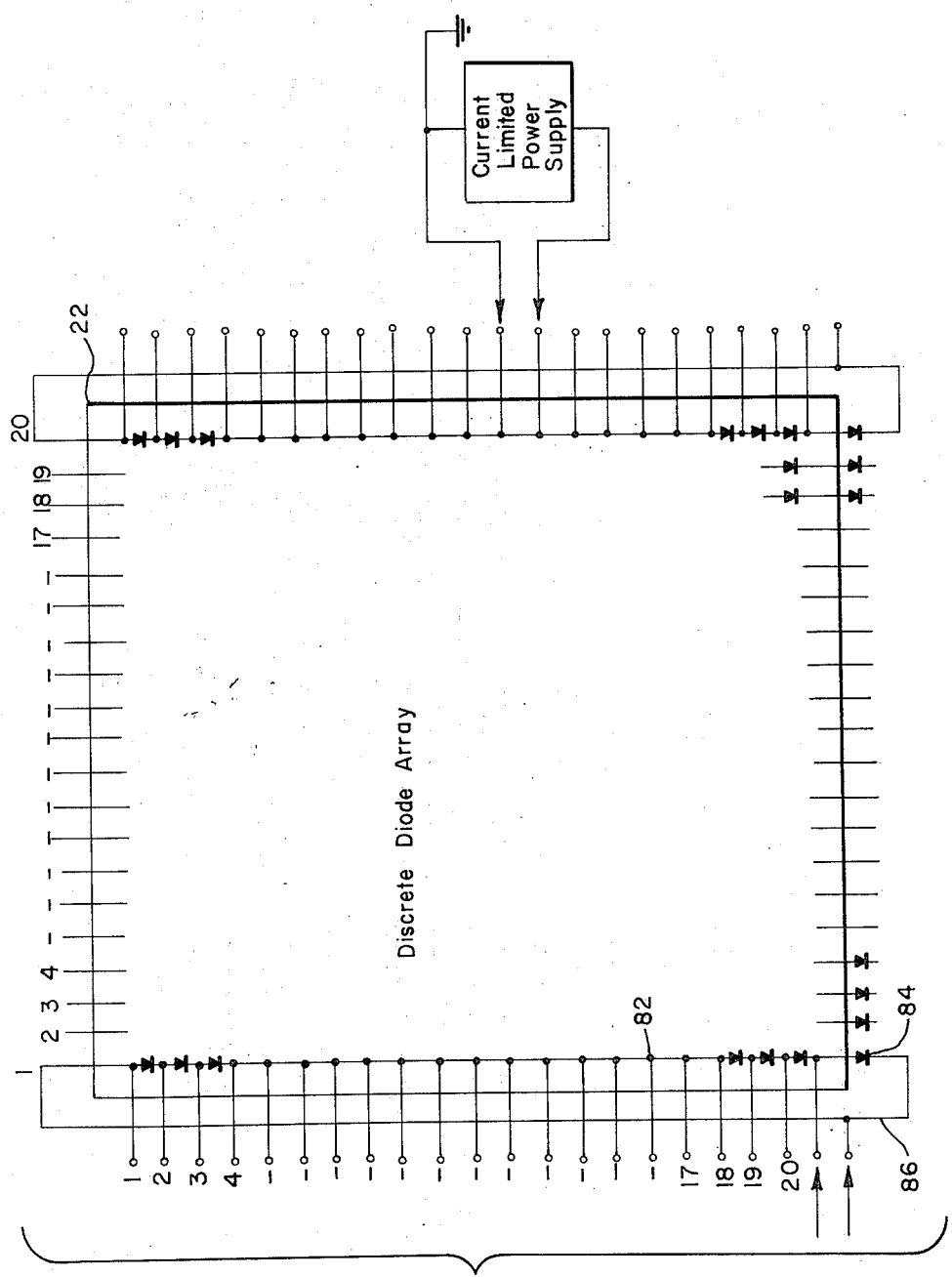
FIG. 5a is a schematic diagram illustrating a portion of the novel X-Y address and digital scanning circuitry for directly driving the image conversion panel.

As mentioned above in the discussion of prior art, prior systems which were utilized for the image conversion of millimeter wave information employed optical modulation of a semiconductor panel for dissecting (scanning) the target reflected RF energy. Contrary to this prior art approach, the system in FIG. 1 utilizes direct carrier injection of the semiconductor image conversion panel 22, and such direct carrier injection is provided by the panel modulator 32. The specific circuitry of this modulator is illustrated in FIGS. 5a and 5b which will be described below. Thus, the speeds for scanning the panel 22 in the system of FIG. 1 are limited only by the carrier recombination times of the semiconductor diodes therein operating in the direct carrier injection mode. These recombination times are substantially less than the carrier lifetimes generated by the optical photon modulation of the image dissecting panels of the above-described prior art systems.

Figure 2B:
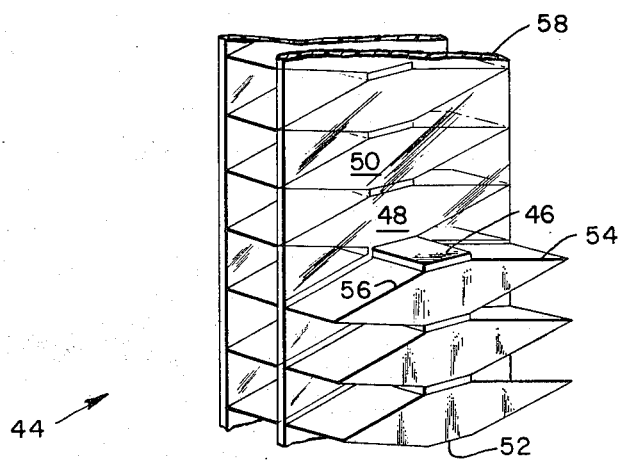
FIG. 2B is an enlarged section of the panel of FIG. 2A.
Figure 2A:
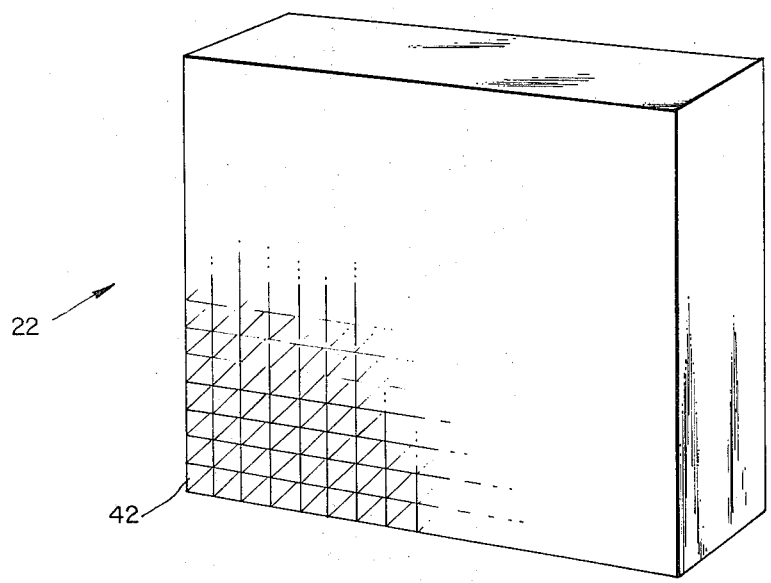
FIG. 2A is an isometric view of the image conversion panel of FIG. 1.

Referring now to FIG. 2A, there is shown an enlarged view of the semiconductor panel 22 which includes an array of 20 rows and 20 columns of discrete diodes 46 (FIG. 2B). Energy passing through each opening 42 in the panel 22, of which there are 400, is collected and concentrated on the individual diodes 46 as shown in FIG. 2B. The need to concentrate the RF energy down to the size of the diodes 46 arises from the fact that, at millimeter wavelengths, the desired panel openings 42 are larger than the individual diodes 46. For example, to take advantage of maximum target resolution while maintaining a minimum number of panel elements, it is necessary that the size of the openings 42 on the face of the panel 22 be only slightly smaller than the minimum resolvable distance, $d_r$, defined by the expression $d_r = 1.46 \lambda$ F/D, where $\lambda$ is the radiation wavelength, F is the focal length of the lens 20 and D is the lens diameter. This expression is known as the Sparrow Resolution Criteria for coherent imaging and is about 20 percent larger than the well-known Rayleigh Resolution Criteria for Incoherent Imaging. For a further detailed description of these imaging concepts, reference may be made to G. B. Parrent and B. J. Thompson, *Physical Optics Notebook*, Society of Photo-Optical Instruction Engineers, Redondo Beach, California 1969, p. 48. Using this criteria at 3.2 mm wavelength and for a F/D = 1.3, one obtains a resolution limit for $d_r$ of 6 mm and a minimum desirable size of 3 to 5 mm for the panel openings 42. This size, however, is considerably larger than the largest PIN diodes 46 which have been fabricated with acceptable electrical and thermal characteristics for use in practicing the invention. It is, therefore, necessary to match the panel opening size 42 to the diode 46 size using the novel energy concentrating structure 22 described herein.

The particular mounting of the diodes 46 is illustrated in the enlarged view of FIG. 2B, wherein the diodes 46 are either bonded securely between the adjacent vanes 48 and 50 with a conductive epoxy cement, or dry mounted with a conductive elastomer seal. A suitable epoxy cement for this purpose is sold under the trade name EPO TEK 410 and is available at Epoxy Technology, Inc., of Watertown, Massachusetts. A suitable elastomer seal, which may advantageously be applied to the top and bottom of the diode 46 to prevent RF leakage, is sold under the trade name CONSIL by Technical Wire Products, Inc., of Santa Barbara, California. The vanes e.g., 48 and 50 comprise the RF energy collecting and concentrating means of the image converstion panel 22, and the PIN diodes 46 rest as shown on the horizontal surfaces 52 of these vanes. The tapered vane surfaces 54 and 56 extend as shown from these horizontal surfaces 52 to the outer edge of the panel 22.

The metal vanes in the 400 element image conversion panel 22 have been fabricated from aluminum because of its combined high thermal and electrical conductivity and its machinability. These vanes are electrically insulated, column-by-column as shown, by a plurality of transparent insulating sheets 58 which advantageously may be sheets (approximately 0.010 inch thick) of a dielectric polymide film sold by the Du Pont Company of Wilmington, Delaware, under the Trade name "Kapton." These dielectric sheets 58 provide the necessary DC voltage insulation between the adjacent columns of serially connected PIN diodes.

Figure 3:
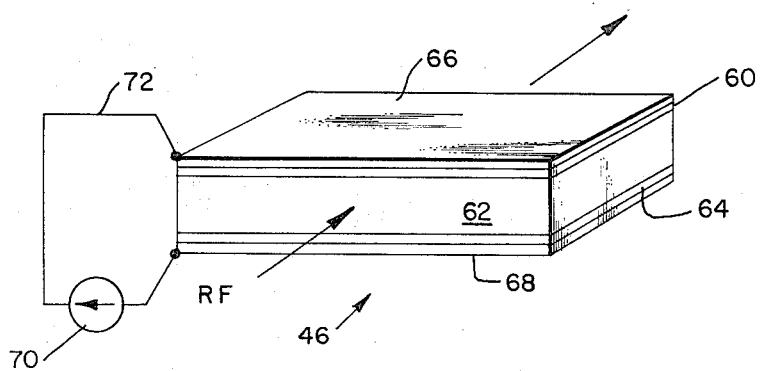
FIG. 3 is an isometric view of the preferred PIN semiconductor diode for use in the image conversion panel of FIG. 2.

In a preferred embodiment of the invention, the PIN diodes 46 are of the type and geometry shown in FIG. 3. These discrete devices include an outer $P^+$ region 60, an intermediate instrinsic N type region 62, and an outer $N^+$ region 64 in the layered geometry shown. These P and N outer layers 60 and 64 may be formed, for example, by implanting conductivity type determining ions into opposite surfaces of an P type substrate starting material; or these layers 60 and 64 may be grown epitaxially and simultaneously doped to control the level of impurity concentration therein. Ohmic contacts to the outer $P^+$ and $N^+$ regions 60 and 64 of the PIN device 46 are provided by metal films 66 and 68 respectively which are deposited using conventional metal evaporation techniques. The actual dimensions for the PIN diode 46 are given in FIG. 3, and the total diode surface area in the panel 22 through which the RF energy propagates is equal to $400 \times 0.05$ cm., which is equal to 10 cm$^2$ of effective PIN diode surface area which scans the incoming RF. This is one tenth (1/10) the vane opening surface area of the complete panel 22 in FIG. 2 above and serves to minimize the heating of the panel 22 by the power dissipated in the diodes.

PIN diodes of the type shown in FIG. 3 and fabricated using state-of-the-art ion implantation techniques are preferred for use in the present system because of their relatively high conductivity modulation at minimum input power. PIN diodes having these characteristics have been fabricated successfully starting with high resistivity II-type silicon 62 and using arsenic ion implantations to form the $N^+$ region 64. Aluminum alloying has been used for forming the $P^+$ region 60. These ion implantation and alloying steps have a maximum temperature on the order of 750° C, which prevents the destruction of long carrier lifetimes (with higher temperatures) within the PIN diodes. These long carrier lifetimes are, in part, responsible for the above-described PIN diode characteristics. These diodes are designed to operate in the double injection low diffusion mode or regime, and this latter characteristic is known in the PIN diode art and is described for example in *Semiconductors and Semimetals* Vol. 6, Chapter IV, pages 201–313 (Academic Press, New York, 1970).

The ohmic contacts 66 and 68 were formed using a platinum silicide, PtSi, metallization in order to insure minimum voltage drops at these diode contact regions. These diode contact voltages, if excessively high, can serverely increase the image panel 22 power requirements; and this ptSi metallization system, which utilizes known state-of-the-art techniques, has been found especially suitable for forming contacts to arsenic implanted diodes.

Figure 4:
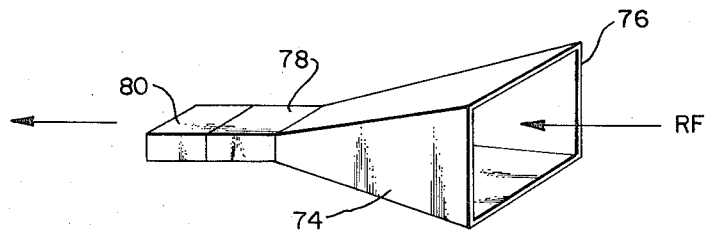
FIG. 4 is an isometric view illustrating an alternative mounting scheme for the semiconductor diodes in the image conversion panel.

The RF collecting and focusing means for the semiconductor panel 22 is not limited to the vane type structure shown in FIG. 2b and may instead utilize a horn mounting scheme, such as the one shown in FIG. 4. This scheme includes a horn 74 with a rectangular cross-section and having large and small openings 76 and 78 therein. A waveguide extension 80 joins the horn 74 at the opening 78, and advantageously, a PIN diode element 46 may be mounted in the waveguide extension 80. The particular area ratio of openings 76 and 78 may be varied in accordance with the desired image conversion panel resolution requirements.

Referring now to FIG. 5a, there is shown the portion of the X-Y panel address circuitry into which the 20 columns of PIN diodes 46 are serially connected. Each diode column, e.g., column 82, (only column 1 and 20 are shown for ease of illustration) includes 20 diodes which are connected respectively to the 20 outside address terminals numbered 1 to 20. Each diode column 82 includes a 21st diode 84 which is external to the 20 × 20 diode array, but which is connected in the diode series circuit as shown. This external diode 84 is for the purpose of enabling all of the remaining diodes in a column to be biased to forward conduction when the power supply is connected directly across the external diode 84. Each one of the 20 diode columns 82 in the 20 × 20 image conversion panel 22 requires a separate power supply which provides the DC current and voltage for forward biasing all but one of the diodes in an addressed column during the scanning operation. All panel diodes in a non-addressed column are forward biased to conduction. As is well-known, a reverse biased PIN diode will pass the RF energy impinging thereon, whereas the forward biased diodes absorb the incident RF energy.

Conventional decoder-driver transistor logic circuitry is connected as shown in FIG. 5b to drive each of the 20 diode columns in response to input digital logic signals. These signals reverse bias, in sequence, each diode in a column before doing the same in each of the successive columns 1 through 20. Columns 1 through 20 are scanned at rates which are limited only by the response times of the individual PIN diodes 46 to direct carrier injection therein. The decoder-driver logic circuit portion in FIG. 5b is only representative of the entire decoder-driver circuitry (not shown) for sequentially reverse biasing each of the diodes in the 20 columns.

This circuitry is connected to drive the diodes D1, D2, D3, D4 and so on, and includes a plurality of NPN transistors 90, 92, 94, 96 which are connected, respectively, to input logic gates 98, 100, 102 and 104. Additional PNP driver transistors 106, 108, 110, and 112 are connected as shown with their base-collector paths in parallel with the respective diodes D1, D2, D3 and D4. If, for example, the diode D1 is to be addressed (reverse biased), then the low level output of the NAND logic gate 98 will be driven high, simultaneously driving the NPN transistor 90 to conduction to thereby simultaneously reduce the base voltage of PNP transistor 106 and bias this transistor into conduction. This rapid switching action thus connects the anode of the diode D1 to substantially ground potentials 114 and connects the cathode of diode D1 substantially to the B$^+$ bias voltage at terminal 116, reverse biasing the diode D1. During this time, the outputs of NAND gates 100, 102 and 104 all remain low, so the three diodes D2, D3 and D4 are biased to forward conduction in the single series circuit, previously described, to which the B$^+$ potential is applied at terminal 116. By sequentially switching the input logic gates 98, 100, 102 and 104 to successively drive their outputs high, the NPN transistors 92, 94 and 96 may be similarly driven to conduction in succession, to thereby sequentially reverse bias diodes D2, D3, D4 and so on until each of the diodes in column 1 of the diode array has been addressed. An identical switching action is utilized for each of the remaining 19 diode columns of the panel 22, and thereafter the above switching sequence is repeated. Further details of the transistor switching circuitry shown in FIG. 5b have not been included herein since this digital circuitry is of a conventional design and the operation of this circuitry will, upon inspection, be fully understood by those skilled in the art.

Various modifications may be made in the above-described preferred embodiments of the invention without departing from the true scope thereof. For example, a number of suitable transistor switching schemes may be employed for sequentially addressing the diode panel 22. Various types of suitable microwave diodes may be used in the panel 22, including variations in the PIN diode structure described above. Additionally, suitable RF collecting and focusing means other than the vanes and horns described above may be utilized in the panel 22 without departing from the true scope of this invention.

What is claimed is:

1. A millimeter wave imaging system including, in combination:
   a. means for radiating a remote target with millimeter wave energy;
   b. means for receiving energy reflected from said target and for controllably projecting same to a predetermined area;
   c. image conversion means in the path of the received energy for collecting said energy and for focussing same on an area smaller than said predetermined area;
   d. address means directly coupled to said image conversion means for digitally scanning and sampling the RF energy focussed at said smaller area; and
   e. means coupled to said image conversion means for processing the sampled RF energy therefrom and for providing a visual display of said remote target in response to said sampled RF energy.

2. The system defined in claim 1 wherein said image conversion means includes a discrete diode array positioned at said smaller area for passing or absorbing the focussed RF energy in response to a driving voltage from said address means.

3. The system defined in claim 2 wherein said array means includes:
   a. a plurality of discrete diodes each having spaced-apart opposing planar surfaces and serially connected in spaced columns, and
   b. said image conversion means includes RF energy collecting vanes mounted on said opposing planar surfaces of each diode in a column, each vane bonded to two adjacent diodes, whereby said vanes form collecting cavities for receiving RF energy at said predetermined area and for concentrating and distributing the energy at each diode in the array, thereby substantially reducing the diode size required for modulating said predetermined area through which the received RF energy is propagated, thereby minimizing the power and heat dissipated by said array.

4. The system defined in claim 3 wherein said diodes are silicon PIN double injection diodes operable in the double injection diffusion mode to provide maximum conductivity modulation at minimum input power.

5. The system defined in claim 2 wherein said diode array means includes:
   a. a plurality of discrete diodes each having spaced-apart opposing planar surfaces and serially connected in spaced columns; and
   b. said image conversion means includes RF energy collecting horns mounted on said opposing planar surfaces of each diode in a column, with each horn bonded to two adjacent diodes, whereby said horns form collecting cavities for receiving RF energy at said predetermined area and for concentrating and equally distributing the RF energy at each diode in the array, thereby substantially reducing the diode size required for modulating said predetermined area through which the received RF energy passes, thereby minimized the power and heat dissipated by said array.

6. The system defined in claim 5 wherein said discrete diodes are silicon PIN double injection diodes operable in the double injection diffusion mode to provide maximum conductivity modulation at minimum input power.

7. The system defined in claim 2 wherein said diode array means includes:
   a. a predetermined number of discrete diodes mounted in prearranged columns to form a discrete diode panel, and said image conversion means includes;
   b. RF collecting means mounted between adjacent diodes in each column and extending therefrom to said predetermined area, so that the RF energy propagated to said predetermined area is focussed by said RF collecting means and concentrated at the individual diodes in said array, whereby the diode size required to modulate the RF energy propagated through said predetermined area is minimized, thereby substantially minimizing the power and heat dissipation in each diode.

8. The system defined in claim 7 wherein said RF collecting means serve to serially connect all of the diodes in a column.

9. The system defined in claim 7 wherein said diodes are silicon PIN double injection diodes operable in the double injection diffusion mode to provide maximum conductivity modulation at minimum input power.

10. The system defined in claim 2 wherein:

a. said diode array means includes a predetermined number of discrete diodes mounted in prearranged columns and said address means includes;
b. a plurality of series circuits into which each column of diodes is serially connected; and
c. means for addressing each diode in a column to reverse bias same while simultaneously forward biasing the remaining diodes in a column whereby each diode in a column is reverse biased in sequence at very high direct carrier injection scan rates.

11. The system defined in claim 10 wherein said image conversion means includes RF collection means mounted between adjacent diodes in each column and extending therefrom to said predetermined area whereby the RF energy propagated through said predetermined area is gathered by said RF collecting means and concentrated at the individual diodes in said array, whereby the diode size required to modulate the RF energy propagated through said predetermined area is minimized, thereby simultaneously minimizing the power and heat dissipated in each diode.

12. The system defined in claim 11 wherein said diodes are silicon PIN double injection diodes, operable in the double injection diffusion mode to provide maximum conductivity modulation at minimum input power.

13. A high resolution image conversion panel for use in an imaging system, including:
a. a predetermined number of discrete diodes mounted in prearranged columns to form a discrete diode array; and
b. RF collecting means mounted between adjacent diodes in each column and extending therefrom to a remote predetermined area, so that the RF energy propagated through said predetermined area is gathered by said RF collecting means and concentrated at the individual diodes in said array, whereby the diode size required to modulate the RF energy propagated through said remote predetermined area is minimized, thereby simultaneously minimizing the power and heat dissipated in each diode.

14. Address circuitry for sampling RF energy propagated through a given plane including, in combination:
a. a predetermined number of discrete diodes mounted in prearranged columns to form a discrete diode array;
b. a plurality of series circuits into which each column of discrete diodes is serially connected; and
c. means for driving each diode in a column to reverse bias same while simultaneously forward biasing the remaining diodes in each column, whereby all diodes in a column may be rapidly scanned in sequence and at very high scan rates.

15. The invention defined in claim 14 wherein:
a. said diode array is positioned in a first plane and within a given area; and said invention further including
b. RF collection means mounted between each adjacent diode in each column and extending therefrom to a remote predetermined area larger than said given area, whereby the RF energy propagated through said remote predetermined area is guided by said RF collecting means and concentrated at the individual diodes in said array, whereby the diode size required to modulate and sample the RF energy propagated through said predetermined area is minimized, thereby simultaneously minimizing the power and heat dissipated in each diode.

16. The invention defined in claim 15 wherein said diodes are silicon PIN double injection diodes, operable in the double injection diffusion mode to provide maximum conductivity modulation at minimum input power.

17. A real time imaging process for providing a visual display of a target comprising:
a. radiating a target with millimeter wave RF energy;
b. controllably projecting the target reflected RF energy in a predetermined path to a selected area;
c. focussing the RF energy arriving at said selected area to concentrate same at a smaller area;
d. addressing a discrete diode array at said smaller area to which the RF energy is focussed to directly inject carriers into individual diodes of said array in a scanning mode, to thereby achieve high RF modulation rates which enable real time imaging operation; and
e. processing the sampled RF energy from said diode array to provide a visual display of said target.

18. The process as defined in claim 17 which includes:
a. serially connecting a plurality of diodes in a column and providing like columns to form said array; and
b. providing a forward bias for each of said columns and for the diodes connected therein; and
c. sequentially sampling each diode in a column by reverse biasing same, while
d. maintaining a forward bias on the remaining diodes in a column.

* * * * *